June 21, 1966     P. MILLER     3,257,263
CONTOURED ORNAMENTATION OF LAMINATED
RESILIENT MATERIALS AND PRODUCT
Filed Dec. 24, 1962     2 Sheets-Sheet 1
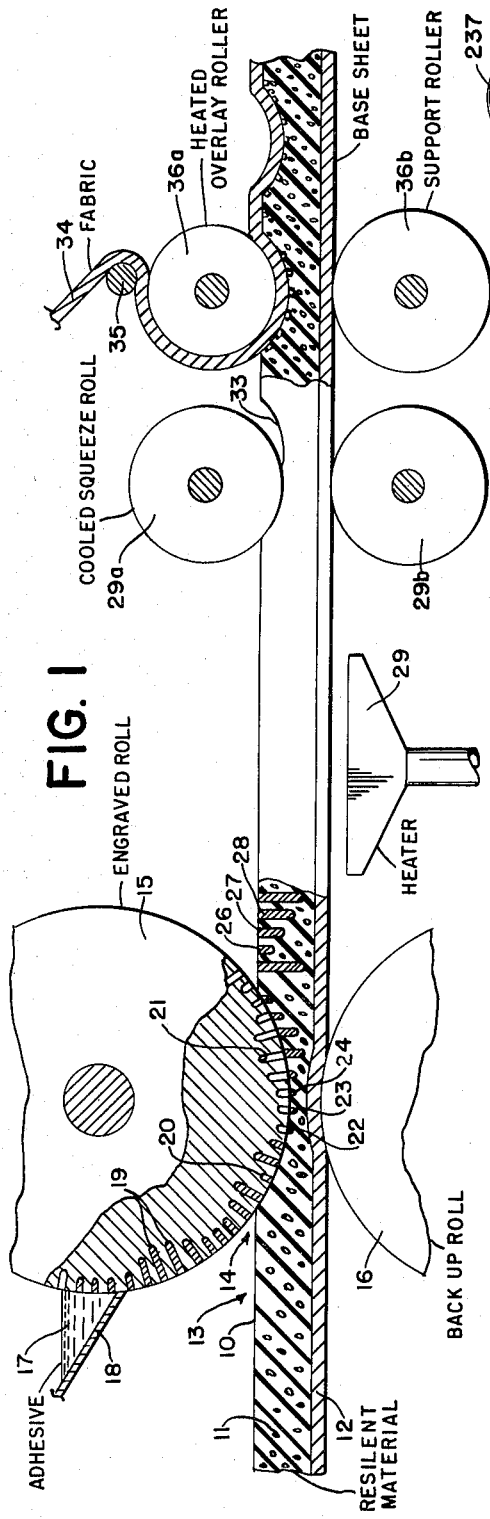
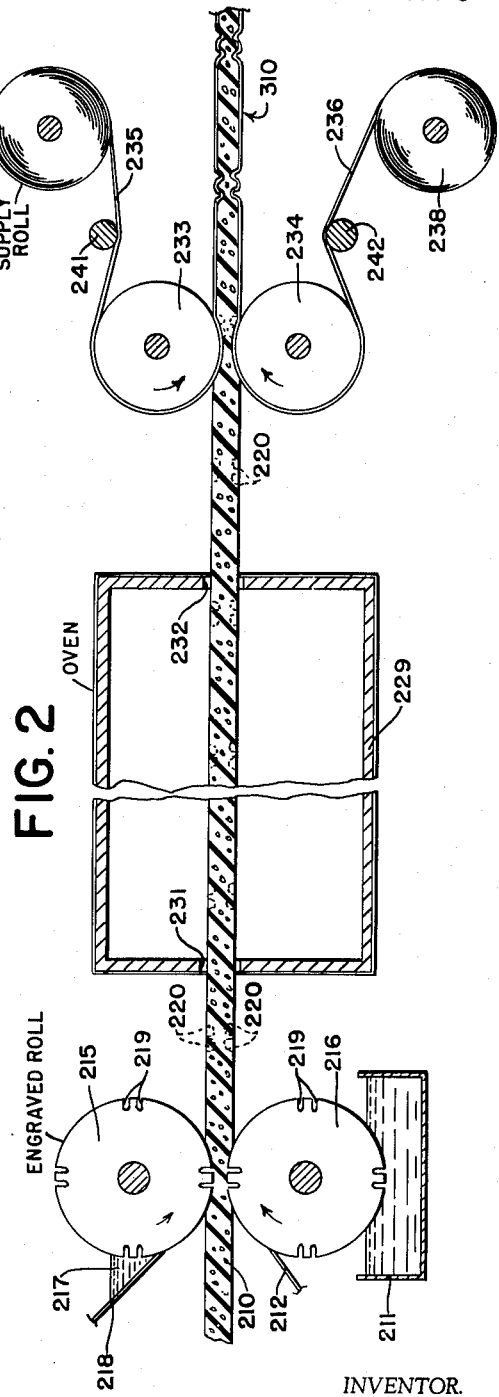
INVENTOR.
PHILIP MILLER
BY Darby & Darby
ATTORNEYS

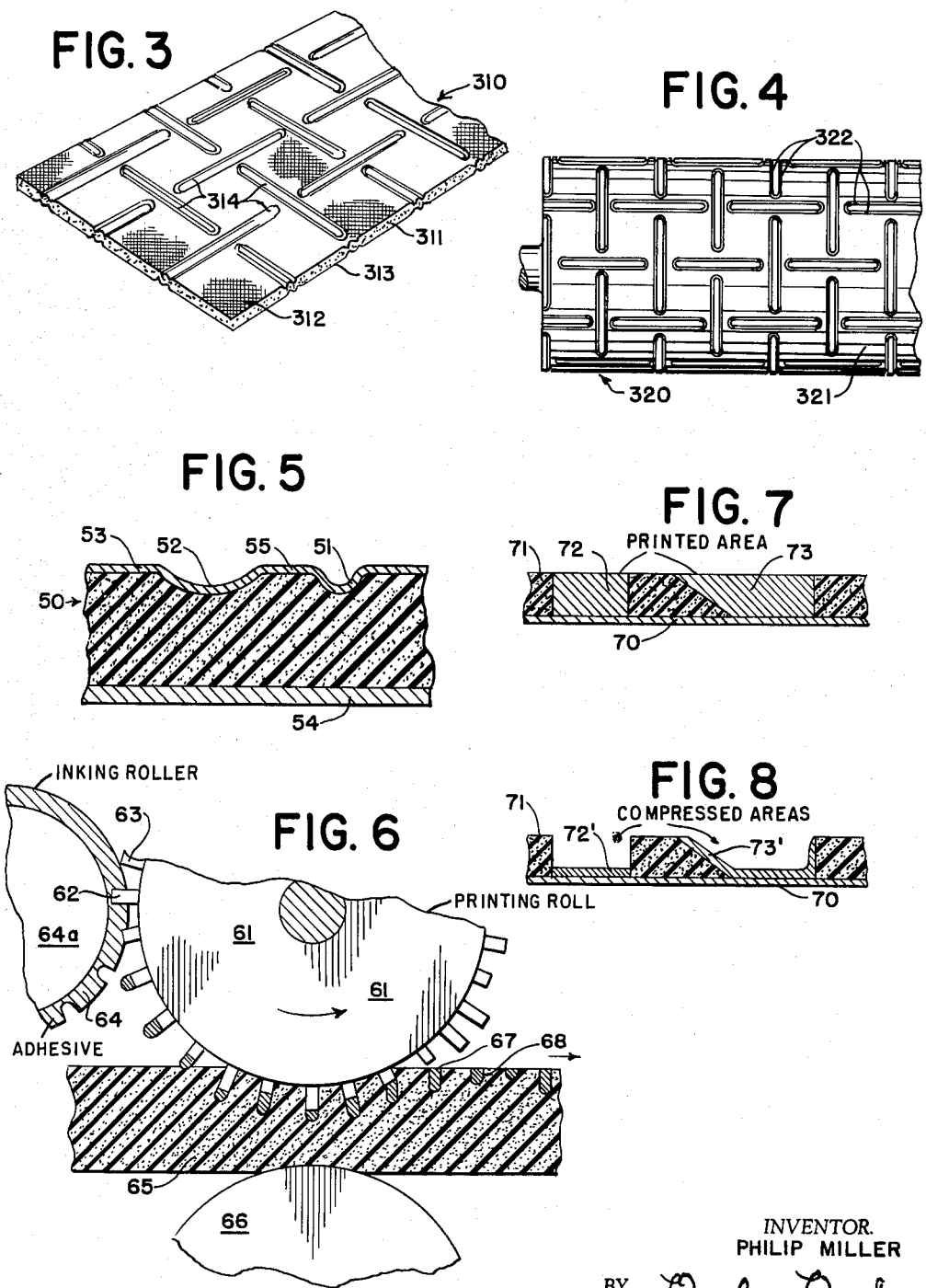

United States Patent Office 3,257,263
Patented June 21, 1966

3,257,263
CONTOURED ORNAMENTATION OF LAMINATED RESILIENT MATERIALS AND PRODUCT
Philip Miller, Yonkers, N.Y., assignor to Hicks & Otis Prints, Inc., Norwalk, Conn., a corporation of Connecticut
Filed Dec. 24, 1962, Ser. No. 246,751
10 Claims. (Cl. 161—119)

This application is a continuation-in-part of copending application Serial No. 44,649 for Ornamentation of Resilient Absorbent Materials, filed July 22, 1960, and issued as U.S. Patent 3,070,476 on December 25, 1962.

This invention relates to contoured ornamentation of fabric overlaid sponge sheet materials and more particularly to the production of surface ornamentation on both sides of a sandwich consisting of a sponge sheet between two stretchable fabric sheets to form a quilt-like material.

In accordance with the invention, a wide variety of surface colorings, contours, contrasts, and combinations of the same may be produced. Perfect registry between ornamentation on the two surfaces may readily be achieved.

The present invention is particularly useful with filler sheet materials which are liquid-absorbent and which are resilient. The degree of resilience may vary considerably, commensurate with the objectives of the invention. Hence, a wide range of hysteresis curves for the resilient material is normally acceptable.

Among the filler materials which are most suitable for the practice of this invention are open-cell foam sheet materials such as polyether and polyester polyurethanes, natural rubber, synthetic rubber, and vinyl plastics. The cells are preferably interconnected initially before the ornamentation process is practiced, but it is also contemplated that closed pore or closed cell materials may be used and the walls between the cells may be broken down mechanically as by crushing, or by heating to expand the gas within the cells or by applying a solvent which penetrates or breaks down portions of the walls between the cells. Representative of the filler materials are foam or sponge rubber materials including foamed latex, and foamed or expanded synthetic rubber polymers and copolymers such as butadiene-styrene, butadiene-acrylonitrile, polyvinylidene, isoprene polymers and copolymers, as well as polyvinyl chlorides and polyvinyl acetates and copolymers thereof and related compositions. "Sponge sheet" as used hereinafter will mean any of the materials described as those to which this process may be applied or their equivalents.

The overlay fabric or web is preferably stretchable. "Stretchable" in this description and in the claims shall include being extendible in one direction and not in others, as in a woven fabric stretchable on the bias; and shall also include being stretchable under artifical conditions only, such as at elevated temperatures, and not under normal conditions, such as at room temperature.

In general, the sponge sheet is simultaneously contoured and overlaid on both sides by a series of steps starting with depositing an adhesive upon selected areas on the surface of the sheet. The thickness of the sheet is then uniformly reduced and the adhesive is at least partially set while the sheet is under compression. The setting of the adhesive may occur in any desired manner as is well known in the adhesive art, e.g., by the passage of time, evaporation of solvent, in situ polymerization or copolymerization or condensation of the components, application of heat or pressure, or otherwise or by a combination of the foregoing. At the same time a stretchable fabric may be overlaid on both sides of the sheet. The sheet is then relaxed, permitting recovery of the unselected areas, contrasted with at least partially continued deformation of the selected areas. Thus, there is formed in accordance with the invention a quilt-like material having selected surface areas where the thickness of the sheet corresponding to the selected areas differs in sectional dimension from other areas of the sheet.

In the preferred embodiment each cross-section of the sheet which has a depressed surface area comprises an adhesive which holds the pores of the sponge at least under partial compression. The term "adhesive" as used herein also may include any composition, whether normally considered an adhesive or not, which has the ability to maintain deformation of the walls of the cell structure, and preferably at elevated temperatures encountered in washing, machine drying or the like.

Various present preferred embodiments of the invention are illustrated in the accompanying drawings, in which:

FIGURE 1 is a diagrammatic illustration of apparatus for producing materials according to the present invention;

FIGURE 2 is a digrammatic illustration of an alternative form of an apparatus for producing materials according to the invention;

FIGURE 3 is an isometric view of material produced according to the present invention and particularly as may be produced from the apparatus of FIGURE 2;

FIGURE 4 is an elevational view of a printing roller suitable for producing the contour pattern of FIGURE 3;

FIGURE 5 is a fragmentary cross section of another material produced according to the invention;

FIGURE 6 is a diagrammatic elevational view of an alternative form of printing roller;

FIGURE 7 is a diagrammatic cross section of a sponge sheet having adhesive deposited thereon to form a variable depth contoured pattern in accordance with the invention; and FIGURE 8 is a similar view of the material of FIGURE 7, after the material has been compressed and partially set.

The process may be readily understood by reference to FIGURE 1. A sheet of spongy resilient material 10, e.g. polyurethane foam, having pores 11 interconnected with each other is backed by a base sheet 12 which may conveniently be a textile fabric or any other material suitable to support the spongy material 10. The sheet 12 is preferably air-pervious to facilitate rapid drying of the spongy material 10; although sheet 12 may, when desirable, be fluid-impervious.

The composite sheet 13 comprising base 12 and sponge 10 is passed through a nip 14 between rolls 15 and 16. Roll 15 is a gravure or engraved roll which is inked in any suitable manner as by an adhesive 17 applied by a doctor blade 18. In the present example the adhesive is of a color contrasting with the sheet 10 although it will not always be so.

In the embodiment shown in FIGURE 1, the roll 16 is a smooth-surfaced cylinder which may be made of metal, or rubber or metal coated with rubber or otherwise suitably constructed. As will be seen in further embodiments the back-up roll 16 may, when desired for surface ornamentation, be an engraved roll similar to roll 15, with either a similar or contrasting design engraved or otherwise produced thereupon. Roll 16 may be caused to be rotated at a speed synchronized with that of roll 15.

The surface of the roll 15 contains engraved or otherwise produced recesses 19. Each of the recesses is inked in any suitable manner by the colored adhesive 17 which is temporarily retained in the recess by adhesive or capillary action or otherwise. As the sheet 13 is fed through the nip between the rolls, those recesses 19 and 20 which are inked are gradually brought into compressive contact with the spongy material, which beginning in the vicinity of the compressed surface at 22, commence to deposit the adhesive into the body of the spongy material 10 as at 23 and 24. The depth of the adhesive thus imprinted corresponds to the depth of the recesses from which the adhesive is deposited. The depth to which the deposited adhesive penetrates and impregnates (these terms being used interchangeably throughout the description and claims) the compressed spongy sheet 10 varies as between imprints 22, 23 and 24, but each penetrates and impregnates transversely into the thickness of the spongy sheet dependent upon the volume of adhesive applied at the proper viscosity.

It will be noted that at the inked impressions 26, 27 and 28, the imprints are all relatively straight lines traversing the thickness of the spongy material. One of the advantages of the present invention, especially when printing spongy material is that the process tends to lessen lateral migration of the adhesive thereby producing relatively sharp-edged, well defined patterns. Apparently the relaxation of the spongy sheet 10, after it leaves the printing nip has the effect of confining the adhesive to transverse paths and minimizes further flow of the adhesive in a direction other than transverse.

After the adhesive is deposited, it is rendered at least partially settable by any suitable means. For example, if the adhesive is in a volatile carrier or solvent, passing the sponge web over a heater 29 to remove at least part of the solvent, renders the adhesive settable and hence the product is ready for the next step. Some adhesives then become tacky.

The sheet is then fed to a pressure device, for example, a pair of squeeze rolls 29A and 29B having a nip therebetween of predetermined dimension less than the normal thickness of the sponge web. This second compression of the sheet, after the adhesive ink has been rendered settable, reduces the thickness of the sheet at the nip. In the areas of the sponge web to which the adhesive has been applied, the selected portions of the sheet remain compressed and the unselected areas of the sheet expand by virtue of the resilience of the sheet, back to their original thickness. Thus, there is produced on the sheet a selected contour corresponding precisely to the adhesive applied to the selected areas. To prevent the inked areas of the sheet from adhering to the squeeze roll 29A in contact therewith, it has surprisingly been found sufficient to cool that roll, preferably below 70° F., for the usual adhesives.

After passing between rollers 29A and 29B, only those portions of the sheet free from adhesive will fully return to their original thickness whereas the cells of the material in the adhesive coated areas will be maintained in deformed condition causing a reduction of thickness of the sheet in these areas as indicated at 33.

According to the invention, a fabric 34 is overlaid on sheet 13 in such a way as to conform to the contour of the upper surface of the sheet.

In many instances, it will be desired that the sheet 34 be stretchable in at least one direction to better conform to the contour of sheet 13 and in such case a knitted fabric may be used to advantage.

It is a desirable feature of the present invention that in many cases the adhesive 17 which is utilized to contour the spongy material may also be utilized as the sole means for securing the fabric 34 to the composite sheet 13. For example, in FIGURE 1, the fabric 34 is guided (from a supply roll, not shown) over a guide roller 35 to an overlay roller 36 which rolls the fabric 34 on to the sheet 13 and applies sufficient pressure to cause adherence between fabric 34 and sheet 13. Roll 36 may, if desired, be a heated steel roll to facilitate adherence between fabric 34 and sheet 13.

Of course, additional adhesive may be utilized to secure the fabric 34 to the sheet 13 as by spraying or otherwise applying such adhesive over the surface of sheet 13 between its passage under roller 29A and under roller 36A.

A support roller 36B cooperates with roller 36A to provide the proper pressure to secure fabric 34 to sheet 13. The completed material merging from between rolls 36A and 36B accordingly is contoured in accordance with the pattern of printing roller 15 and it has secured thereto in conformation with such contour, a fabric overlay 34.

In some cases, the fabric 34 may be partially transparent and the adhesive 17 colored. Thus the pattern of the adhesive 17 on the spongy sheet 10 will be partially visible through fabric 34 to provide a further decorative effect. Obviously the spongy sheet 10 or the fabric 34, or both, may be imprinted before or after processing as illustrated in FIGURE 1 with any desired design by conventional process to provide additional decorative effect.

It is contemplated in the arrangement of FIGURE 1, that the backing 12 be previously applied to spongy sheet 10 by any of numerous techniques known in the art and that the thickness of the spongy sheet 10, and the character of the backing 12, relative to the fabric overlay 34 be such that the contour effect will be predominant on the upper surface of the finished sheet as illustrated in FIGURE 1. Contour effects may be provided on both sides of sheet material according to the present invention, for example, by apparatus as illustrated in FIGURE 2. By the somewhat more complicated technique of sandwiching single surface contoured sheets back to back, a front and back contoured surface may also be obtained.

In FIGURE 2 a sheet of spongy resilient material 210, e.g. open pored polyurethane foam, is passed through a nip 214 between rolls 215 and 216.

Rolls 215 and 216 are gravure or engraved rolls which are inked in any suitable manner with an adhesive 217. For example, the ink 217 may be appropriately applied by doctor blade 218 to roll 215 and may be applied to roll 216 by partial immersion in a reservoir 211 with the excess being removed by a further doctor blade 212.

The surfaces of rolls 215 and 216 contain engraved or otherwise produced recesses 219. It will be understood that the adhesive 217 is temporarily retained in the recesses 219 by adhesive action, capillary action, or the like.

As the sheet 210 is fed through the nip 214, between the rolls, the recesses 19 are gradually brought into compressive contact with the sheet 210, the recesses of roll 215 in contact with the upper surface of the sheet and the recesses of the roll 216 in contact with the lower surface of the sheet.

The recesses commence to deposit the adhesive into the body of the spongy material 10 substantially as explained with respect to FIGURE 1.

The patterns on rolls 215 and 216 may be identical and the rolls may be rotated in synchronism to produce contours on the respective surfaces of sheet 210 which are corresponding and in register, i.e. coincident. Alternatively different patterns may be utilized on the respective rolls or the patterns may be intentionally out of register and/or of different periodicity.

After the adhesive is deposited, it is rendered at least partially settable by any suitable means. In FIGURE 2, the specific means is an elongated oven 229 having openings 231 and 232 for the ingress and egress of the sheet 210.

The sheet 210 is then fed to a pressure device, for example, a pair of squeeze rolls 233 and 234 having a nip therebetween of predetermined dimension less than the normal thickness of the sponge web.

Rolls 233 and 234 also serve to guide fabric sheets 235 and 236 into place on the upper and lower surfaces respectively of sheet 210. Long continuous sheets of fabric 235 and 236 may be supplied from supply rolls 237 and 238. Appropriate tension controlling mechanism such as idler rollers 241 and 242 may be provided.

The second compression of the sheet 210 along with fabric sheets 235 and 236 reduces the thickness of sheet 210 at the nip of rolls 233 and 234 and causes fabric sheets 235 and 236 to adhere to spongy sheet 210 in those areas 220 where it is coated with adhesive 217. Rolls 233 and 234 are preferably heated rolls which may be formed of steel, aluminum or the like. The heating of rolls 233 and 234 facilitates adherence of fabric sheets 235 and 236 to the spongy sheet 210. The heating may be accomplished by steam, electrically, or one of many other techniques well known in the art, and the roll temperature may be 250° F., for example, or generally from 150–350° F. In many instances it will be preferred that the fabric overlay be heated to a greater extent than the spongy filler sheet when passing between rolls 233 and 234. (Heating the overlay more efficiently accomplishes the purpose of aiding adhesion of the overlay to the spongy sheet.) Greater heating of the overlay is provided by allowing it to pass around a substantial portion of the periphery of rollers 233 and 234. The same adhesive material deposited in areas 220 causes walls of the cells of spongy sheet 210 to adhere together and be permanently deformed. Accordingly, such areas do not return to their original thickness after passing between rolls 233 and 234, and, as a result, both surfaces of the composite sheet 210, 235, 236 are contoured in a pattern corresponding to that laid down by printing rolls 215 and 216.

Attractively decorated sheet material may thus be produced by the apparatus of FIGURE 2, for example, the simulated quilted material of FIGURE 3.

As will be seen from FIGURE 3, the simulated quilted material 310 comprises an open-pored resilient sheet material 311 such as polyurethane foam sandwiched between respective layers 312 and 313 of web material which may be, for example, woven textile fabric, nontextile sheet, or knitted textile fabric. The latter is particularly desirable by virtue of the fact that it is resiliently stretchable and thus easily conformed to the pattern of depressions 314 which provide the quilting effect in the composite sheet material 310.

As an example of nontextile sheet, a plastic sheet material such as polyethylene, polypropylene or polymers or copolymers of vinyl chloride may be utilized. In such case it may be desirable to maintain the final rolls at a temperature which will soften but not melt the plastic sheet.

Where woven fabric is used as overlay it is desirable to arrange the woven fabric on the bias with respect to elongated depressions in the pattern as shown in FIG. 3.

Preferably, the adhesive 17, utilized to form the sheet material 310, is one which is not adversely affected by high temperatures (e.g. 250° F.) so that the simulated quilted fabric 310 may be machine washed and machine dried without detrimental effect.

The material of FIGURE 3 has numerous advantages for use such as a bed cover, clothing lining etc. in that it is inexpensive, and of light weight with good insulation properties.

Quilted material produced on a multiple-needle sewing machine is relatively expensive due to the slow speed of an operation of uch a machine as compared with a machine according to applicant's invention. Furthermore, there are practically no limitations on the pattern of quilting producible by applicant's machine whereas many limitations exist with respect to quilting produced on a multiple-needle sewing machine.

FIGURE 4, shows a form of printing roller suitable to produce the material of FIGURE 3. The roller 320 has a generally cylindrical surface 321 with depressions 322 forming a pattern having a generally square grid-like configuration corresponding to the pattern desired for the finished material illustrated in FIGURE 3.

While the apparatus and process illustrated in FIGURE 2 contemplates depositing adhesive directly on the spongy sheet, it may in some cases be preferred to print the fabric overlay with the adhesive which will then be coated on to the spongy material upon the joinder of the fabric and the spongy material giving generally the same result as that of FIGURE 2.

FIGURE 5 shows an embossed spongy sheet producible for example by the apparatus of FIGURE 1 in which the sponge layer 50 has depressions 51 and 52 formed in suitable manner such as described above. A superposed sheet of surface coating material 53 may comprise a knitted, woven or other fabric, sheet plastic such as polyethylene, vinyl sheeting, or other similar laminar material. In a preferred form the material is stretchable to facilitate deeply contouring the composite sheet. The base 54 may be attached or applied before or after the contouring operation or may be omitted. This sheet 50 is made by first applying adhesive in the manner described above. The adhesive does not benefit by a color component unless the layer 53 is translucent. The layers 50, 53 and 54 may be adhered together in the above described manner so that contoured material body is produced having an upper added layer conforming to the contour, which conformation is achieved solely by the adhesive which creates the contoured effect in material 50.

As shown in FIGURE 6, the printing roll 61 may have long projections 62 and short projections 63 to pick up adhesive 64 from a rubber inking roller 64a. As the sponge rubber sheet 65 passes between the nip between rollers 61 and 66, the adhesive is deposited at 67, 68 etc. Longer projections 62 would pick up less adhesive while shorter projections 63 would pick up a greater amount, thereby achieving substantially the result achieved by the apparatus of FIG. 1. Various other types of printing rollers may be used to deposit the adhesive.

FIGURE 7 shows a cross-section of a web 70 supporting a spongy material 71 having one area 72 produced all the way through the spongy material and another wedge-shaped section 73 of adhesive applied at another selected area and cross-section. This fabric after deposit, as shown in FIGURE 7, is heated, the adhesive rendered tacky, and then is passed through a cold nip. After relaxation, the material shown in FIGURE 8 is produced. Here the spongy layer 71 attached to the web 70 has a compressed area 72' corresponding to printed area 72 and another slanted area 73' contoured corresponding generally to printed area 73. Thus contours of desired slope as well as depth may be formed and substantially reproduced in an overlaying fabric (not shown). FIGURES 7 and 8 therefore illustrate the manner in which the depth and slope of contour in materials according to the invention may be controlled by controlling the density of adhesive deposited as by roll 15.

The product of the present invention is useful not only as decorative material but may be utilized as heat and sound insulators, for example, on airplane cabin surfaces, automobile passenger compartments on walls of rooms, as box linings, as bed coverings, for clothing and in other applications where decoration or insulation or both are desired. In auto body headliners, the flexibility and resilience of the invention greatly facilitate installation by unskilled labor. Fire-retardant or other coatings may be applied to the outer surface of the decorating materials, either before or after printing, embossing and processing, so long as such application does not harm the final characteristics sought in the ultimate product.

Various printing compositions may be used in which dyes, inks, pigments, lacquers, and other suitable coloring compositions may impart the desired tint or hue. The adhesive may be rubber cement, rubber latex, synthetic rubber cement, cellulose cement, heat-sensitive adhesives, pressure-sensitive adhesives, and thermosetting compounds. Particularly advantageous results have been obtained using epoxy resins, with various catalysts well known in the adhesive art.

Any material may be used having adhesive properties and which can be injected by the printing process into the body of the spongy material. The adhesive may be applied by a continuous process such as described above, or may be done on a flat plate process such as silk screenings, followed by a flat plate or press squeezing process to impart the necessary ultimate contour of the material.

If desired, the process may be practiced by first printing the total or partial surface with the adhesive, then over-printing with a solvent (inked or clear) to relax the compressed portion.

While the invention may obviously be practiced with a wide variety of materials as indicated herein, the following examples are preferred embodiments which have been used with success. In each instance the parts are by weight unless otherwise stated.

Example 1

The adhesive formulation may be in the following range:

Acrylonitrile rubber (butadiene acrylonitrile copolymer) 10–40%.
Vinyl chloride-vinyl acetate resin 45—15% (generally used in decreasing amounts with increasing amounts of acrylonitrile rubber).
Toluol 20–60%
Methylethyl ketone 10–40%

Almost any dye or pigment may be used to impart a desired color to the adhesive. Viscosities may range 100 cps. to 5000 cps. depending upon the depth of engraving, speeds of operation, and drying times desired. The amounts of rubber and vinyl resin may vary and either may be omitted if desired. The solvents may also be varied, depending upon the consistency and requirements of the adhesive.

Example 2

| | Parts |
|---|---|
| Polyester solution (Du Pont #46951) 20% solids | 25 |
| Isocyanate solution (Du Pont #RC–805) 60% solids | 7 |

The above resins are mixed and color added, if desired, either dyes or pigments. The viscosity can be adjusted by adding either dioxane, methyl ethyl ketone, or tetrahydrofuran so that a good printing viscosity is achieved, namely, 150 to 300 c.p.s.

Example 3

| | Parts |
|---|---|
| Epoxy resin (Shell Chemical Co. #1003), parts solids, in a 70% solution | 60 |
| Polyamide cure (General Mills Corp. #125), parts solids in a 70% solution | 40 |
| Pigment, e.g. TiO$_2$ solids | 100 |
| Total solids | 200 |

Example 4

| | Percent |
|---|---|
| Acrylic ester resin (Rohm & Haas B72) | 30 |
| Toluol (solvent) | 70 |

Mixtures of vinyl resins and acrylic resins may be used with appropriate solvents in the adhesive formulations.

Example 5

Linear thermoplastic polyester resin (Goodyear Rubber Co. Vitel PE–207) is dissolved in a suitable solvent such as Toluol in sufficient quantity to provide about 20% solids in solution. An optional added ingredient to give high temperature and solvent resistance in an isocyanate (for example, Du Pont #RC–805). About 10% added isocynate provides desirable temperature and solvent resistance. The amount of such resistance varies generally with the amount of isocyanate, however, and thus the quantity of isocyanate may be varied to obtain a wide range of characteristics.

Example 6

A further adhesive formulation may be provided by substituting for Vitel PE–207, Du Pont adhesive #46960 and as an isocyanate Du Pont No. RC–805 in Example 5.

While certain present preferred embodiments of the invention have been shown and described, it is to be understood that the invention may be otherwise embodied and practiced within the scope of the appended claims.

What is claimed is:

1. An embossed sheet material comprising a sheet of liquid permeable, compressible and restorable material having a surface including relatively depressed areas, said sheet being of reduced thickness in said areas, the surface portions of said reduced thickness portions being coated with an adhesive material, said sheet in said reduced thickness portions having compressed cell structure maintained in said compressed state by said adhesive material, the undepressed areas of said sheet being substantially free of said adhesive and a layer of laminar material adhered to the surface of said sheet only by said adhesive at said adhesive coated portions of said sheet.

2. An embossed sheet material according to claim 1 wherein the depressed areas of said sheet are of elongated shape and wherein the laminar material is a woven textile fabric arranged predominantly on the bias with respect to said areas of elongated shape.

3. An embossed sheet material according to claim 1 wherein the adhesive coated on selected areas of said sheet is a colored adhesive material having a color contrasting with that of said sheet and said laminar material is a translucent layer of laminar material.

4. An embossed sheet material comprising a sheet of liquid permeable, compressible and restorable material having a surface including relatively depressed areas, said sheet being of reduced thickness in said areas, the surface portions of said reduced thickness portions being coated with an adhesive material, said sheet in said reduced thickness portions having compressed cell structure maintained in said compressed state by said adhesive material, the undepressed areas of said sheet being substantially free of said adhesive material and a layer of stretchable laminar material coextensive with said sheet adhered to the surface of said sheet only by said adhesive at the adhesive coated portions of said sheet, said laminar material substantially conforming to the contours of the surface of said sheet.

5. An embossed sheet material according to claim 4 wherein said laminar material is normally resiliently stretchable.

6. An embossed sheet material comprising a sheet of liquid permeable, compressible and restorable material each surface thereof including relatively depressed areas, said sheet being of reduced thickness in said areas, the surface portions of said reduced thickness portions being coated with an adhesive material, said sheet in said reduced thickness portions having compressed cell structure maintained in said compressed state by said adhehive material, the undepressed areas of said sheet material being substantially free of said adhesive material, a first layer of laminar material coextensive with said sheet adhered to one surface of said sheet only by said adhesive at the adhesive coated portions of said sheet and a second layer of laminar material coextensive with said sheet adhered to said sheet only by said adhesive at the adhesive coated portions of said sheet, said laminar material substantially conforming to the contours of the surface of said sheet.

7. A material according to claim 6 wherein the laminar material is stretchable.

8. The process of laminating and contouring a liquid permeable, compressible and restorable sheet which comprises coating an adhesive onto selected areas of the surface of said sheet, placing a layer of laminar material on said surface substantially coextensively therewith, at a time when said adhesive is settable, reducing the thickness of at least portions of said sheet and pressing said laminar material against said adhesive coated areas of said sheet to adhere said laminar material to said sheet only at the adhesive coated portions of said sheet, at least partially setting said adhesive while said sheet is in compression, and relaxing the compression on said sheet to conform said laminar material to the resulting contours of the surface of said sheet.

9. The process of laminating and contouring a liquid permeable, compressible and restorable sheet which comprises coating an adhesive onto selected areas of both surfaces of said sheet, placing a layer of laminar material on each of said surfaces of said sheet substantially coextensively therewith, at a time when said adhesive is settable, reducing the thickness of at least portions of said sheet, and pressing said laminar material against said adhesive coated areas of said sheet to adhere each of said laminar material to said sheet only at the adhesive coated portions of said sheet, at least partially setting said adhesive while said sheet is in compression and relaxing the compression on said sheet to conform said laminar material to the resulting contours of the surface of said sheet.

10. The process according to claim 9 wherein said adhesive is simultaneously coated onto the opposite surfaces of said sheet to form substantially coincident patterns of adhesive coated areas on the surfaces of said sheet.

References Cited by the Examiner
UNITED STATES PATENTS

| | | | |
|---|---|---|---|
| 2,792,320 | 5/1957 | Bower | 161—161 XR |
| 3,012,926 | 12/1961 | Wintermute et al. | 156—219 |
| 3,070,476 | 12/1962 | Miller | 161—119 |

EARL M. BERGERT, *Primary Examiner.*

H. E. EPSTEIN, *Assistant Examiner.*